US009135193B2

(12) United States Patent
Myrah et al.

(10) Patent No.: US 9,135,193 B2
(45) Date of Patent: Sep. 15, 2015

(54) EXPANDER INTERRUPT PROCESSING (71) Applicant: HEWLETT-PACKARD DEVELOPMENT COMPANY, L.P., Houston, TX (US)

(72) Inventors: Michael G. Myrah, Cypress, TX (US); Balaji Natrajan, Spring, TX (US); Rodrigo Stoll Martins Machado, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 13/849,616

(22) Filed: Mar. 25, 2013

(65) Prior Publication Data

US 2014/0289437 A1 Sep. 25, 2014

(51) Int. Cl.
G06F 13/24 (2006.01)
G06F 3/06 (2006.01)
G06F 13/32 (2006.01)
G06F 13/36 (2006.01)

(52) U.S. Cl.
CPC .............. *G06F 13/24* (2013.01); *G06F 3/0628* (2013.01); *G06F 3/0634* (2013.01); *G06F 13/32* (2013.01); *G06F 13/36* (2013.01); *G06F 2213/0028* (2013.01)

(58) Field of Classification Search
CPC ................. G06F 13/24; G06F 13/32; G06F 13/36–13/366
See application file for complete search history.

(56) References Cited

U.S. PATENT DOCUMENTS

| 6,393,508 | B2* | 5/2002 | Rekeita et al. ................ 710/243 |
| 7,096,293 | B2* | 8/2006 | Lee ................ 710/244 |
| 7,249,210 | B2* | 7/2007 | Ganasan et al. ............ 710/117 |
| 7,536,508 | B2 | 5/2009 | Davies |
| 7,778,960 | B1 | 8/2010 | Chatterjee et al. |
| 7,797,394 | B2* | 9/2010 | Wu et al. ....................... 709/214 |
| 8,239,655 | B2 | 8/2012 | Goggin et al. |
| 8,527,685 | B2* | 9/2013 | Aggarwal et al. ............ 710/300 |
| 2005/0010706 | A1* | 1/2005 | Lee ................ 710/113 |
| 2006/0200607 | A1* | 9/2006 | Subramaniam Ganasan et al. ............... 710/113 |
| 2006/0235937 | A1* | 10/2006 | Wu et al. ....................... 709/214 |
| 2007/0143515 | A1* | 6/2007 | Kershaw et al. ............. 710/264 |
| 2008/0077721 | A1* | 3/2008 | Terakawa ..................... 710/240 |
| 2012/0317324 | A1* | 12/2012 | Aggarwal et al. ............ 710/300 |
| 2014/0143464 | A1* | 5/2014 | Natrajan et al. ............. 710/117 |
| 2014/0164670 | A1* | 6/2014 | Voorhees et al. ............ 710/316 |
| 2014/0244875 | A1* | 8/2014 | More et al. .................... 710/116 |

* cited by examiner

*Primary Examiner* — Ryan Stiglic
(74) *Attorney, Agent, or Firm* — Hewlett-Packard Patent Department (57) ABSTRACT In one example in accordance with aspects of the present disclosure, an expander is provided. The expander comprises a workload scheduling module to cause the expander to enter a first mode of operation where the expander processes interrupts, and further to enter a second mode of operation where the expander processes interrupts for up to a predetermined time period before responding to at least one of Serial Management Protocol (SMP) commands and Serial SCSI Protocol (SSP) commands with a retry message.

20 Claims, 7 Drawing Sheets

EXPANDER INTERRUPT PROCESSING

BACKGROUND

Serial attached SCSI (SAS) is generally a point-to-point architecture that transfers data to and from small computer system interface (SCSI) storage devices by using serial communication. In a SAS storage environment, there are typically three types of SAS devices: initiators, targets, and expanders. The initiator is generally a device that originates processing requests for a target and receives responses from the target. The initiator may be, for example, a host bus adapter (HBA), SAS controller, or other data storage controllers. The target is generally a device that receives processing requests from initiators and sends responses to the respective initiators. The target may be, for example, an end device such as a SAS hard disk drive, serial ATA (SATA) hard disk drive, solid state disk (SSD), JBOD, and/or SAS tape drive. The expander is generally an intermediate device that forms part of the service delivery subsystem and facilitates communication between initiators, targets, and/or other expanders, among other functions. Stated differently, the expander is a device that functions as a switch and scales the number of targets attached to an initiator, thereby creating a larger SAS domain.

BRIEF DESCRIPTION OF THE DRAWINGS

Examples are described in the following detailed description and in reference to the drawings, in which.

DETAILED DESCRIPTION

The present disclosure is generally directed to processing interrupts at an expander. More particularly, the present disclosure is generally directed to an intelligent manner for an expander to process interrupts, such as interrupts associated with Serial SCSI Protocol (SSP) and/or Serial Management Protocol (SMP) commands.

As mentioned in the foregoing, an expander is generally an intermediate device that forms part of the service delivery subsystem and facilitates communication between initiators, targets, and/or other expanders. More specifically, the expander may establish connections between initiators, targets, and/or other expanders by receiving commands (e.g., Serial SCSI Protocol (SSP) and Serial Management Protocol (SMP) commands) and routing these commands and/or data associated therewith based on the SAS address of the target.

In addition to high priority tasks such as routing commands and processing interrupts associated therewith, the expander may also conduct lower priority tasks such as monitoring and controlling various environmental subsystem devices (e.g., temperature sensors, fans, and/or power supplies). While the expander may typically handle both the high and low priority tasks without issues, there are instances when the processing of the high priority tasks (e.g., processing interrupts associated with SMP and/or SSP commands) starves out the processing of low priority tasks (e.g., environmental processing). In particular, SMP and SSP commands often require that the corresponding interrupts be processed within a certain time window (e.g., 1 ms), and therefore such commands receive higher priorities than other tasks. In some situations, when there are a large number of initiators sending SMP and/or SSP commands to the expander at the same time, low priority tasks may be starved out. This often results in Inter-Integrated Circuit (I2C) protocol issues, intermittent false reporting of data issues, and heartbeat timeout issues. These issues are especially common in SAS fabric failure mode scenarios, such as when SMP discovery of an initiator in the fabric becomes trapped in an infinite loop, or when all initiators boot at the same time and flood the expander with commands.

Various aspects of the present disclosure may address the above-mentioned problems by implementing an intelligent protocol to hold off SAS commands targeting a storage enclosure processor (SEP) in a SAS expander in certain circumstances in order to guarantee execution time slices for lower priority tasks. For instance, in one aspect of the present disclosure, a SAS expander may enter a first mode of operation where the SAS expander processes interrupts. The SAS expander may then enter a second mode of operation where the SAS expander the processes interrupts for up to a predetermined time period (e.g., 100 mS) before responding to SMP and/or SSP commands with a retry message (e.g., an OPEN_REJECT (RETRY) primitive) in order to guarantee an execution time slice for lower priority matters.

In another aspect of the present disclosure, a SAS expander may comprise a workload scheduling module to cause the expander to enter a first mode of operation where the expander processes interrupts, and further to enter a second mode of operation where the expander processes interrupts for up to a predetermined time period before responding to SMP and/or SSP commands with a retry message, and where the expander conducts low priority processing functions during the second mode of operation.

In still another aspect of the present disclosure, a non-transitory processor readable medium comprises instructions which, when executed, nausea SAS expander to enter a first mode of operation, wherein during the first mode of operation the SAS expander processes at least one of SMP and SSP interrupts, and further cause the SAS expander to enter a second mode of operation, wherein during the second mode of operation the SAS expander processes at least one of SMP and SSP interrupts for up to a predetermined time period before responding to the at least one of SMP and SSP commands with a retry message.

Figure 1:
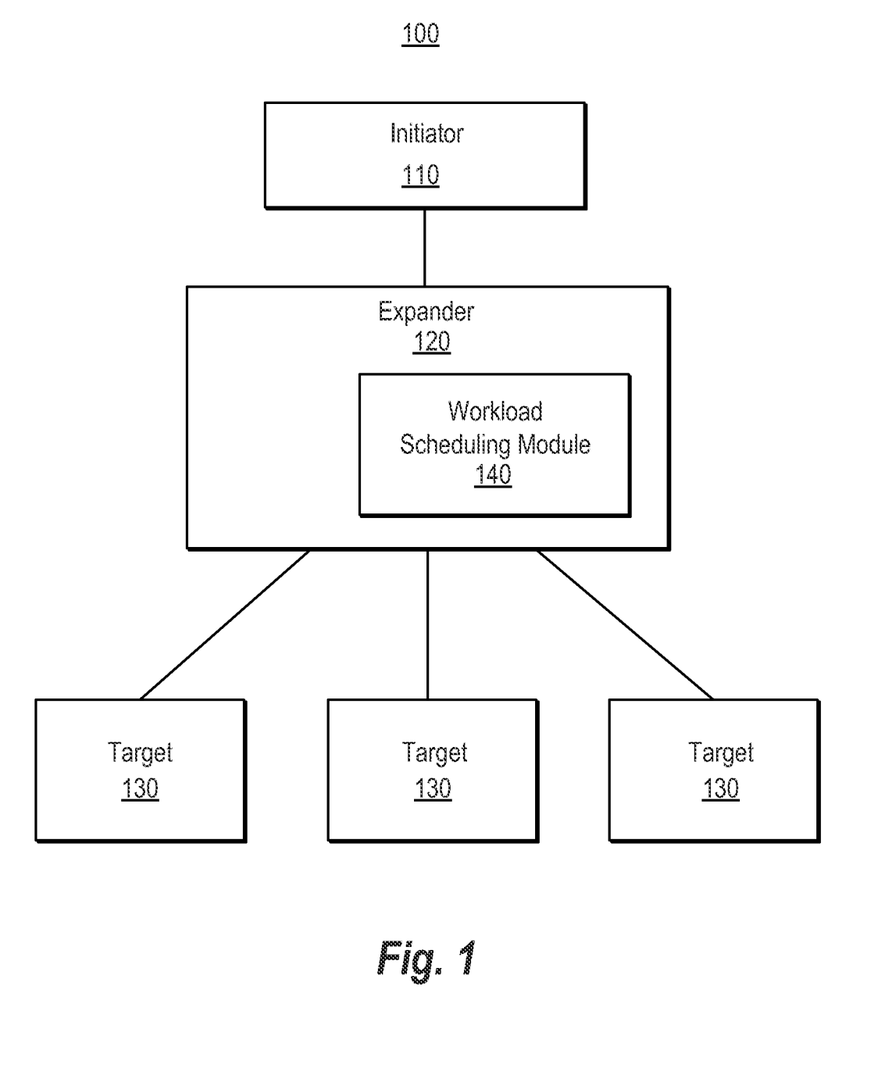
FIG. 1 depicts an example system comprising an initiator, an expander, and targets in accordance with an implementation.

FIG. 1 depicts an example system 100 in accordance with an implementation. The system comprises an initiator 110, an expander 120, and a plurality of targets 130. It should be readily apparent that the system 100 is a generalized illustration and that other elements may be added or existing elements may be removed, modified, or rearranged without departing from the scope of the present disclosure. For example, while the system 100 depicted in FIG. 1 includes only three targets 130, the system may actually comprise more or less targets or other components. Similarly, while the system 100 depicted in FIG. 1 includes only one initiator 110 and one expander 120, the system 100 may actually comprise a plurality of such components, and only one of each has been shown for brevity.

The initiator 110 may be, for example, a host bus adapter (HBA). SAS controller, or another type of data storage controller. The initiator 110 may have multiple ports for connection to internal and/or external targets. Each initiator port may have a single physical link (e.g., a narrow port) or two, four, or eight physical links (e.g., a wide port). In a SAS domain, the initiator 110 may comprise Serial SCSI Protocol (SSP), Serial ATA Tunneling Protocol (STP), and/or Serial Management Protocol (SMP) initiator ports. The initiator 110 may generally function to originate processing requests for a target 130 and/or to receive responses from the target 130. More specifically, the initiator 110 may originate device-service and task-management requests for processing by a target 130, and receive responses for the same requests from the target 130. Depending on the implementation, the initiator 110 may be connected directly to a target 130 or indirectly via an expander 120. Such connection may be made via, e.g., physical links consisting of two wire pairs connecting the transmitter of a PHY in one device (e.g., the initiator 110) to the receiver of a PHY in another device (e.g., the expander 120).

The targets 130 may be, for example, end devices such as a SAS hard disk drives, serial ATA (SATA) hard disk drives, solid state disks (SSD). JBODs, or SAS tape drives. The targets 130 may include logical units and target ports that receive device service and task management requests for processing and send responses for the same to initiators 110. As mentioned, depending on the implementation, the target 140 may be connected directly to an initiator 110 or indirectly via an expander 120.

The expander 120 may be, for example, a SAS expander. The expander 120 may form part of the service delivery subsystem and facilitate communication between initiators 110, targets 130, and/or other expanders 120 (not shown). More particularly, the expander 120 may establish connections between initiators 110, targets 130, and/or other expanders 120 by receiving commands and data in one port and routing them to another port based on the address (e.g., SAS address) of the target 130.

The expander 120 may use direct, table, and/or subtractive routing processes. The direct routing may be used to forward commands and/or data to targets directly attached to the expander 120. The table routing may be used to forward commands and/or data to another expander 120. The subtractive routing may be used to forward commands and/or data which the expander does not recognize to another expander 120 which does recognize the information. In addition to routing, the expander 120 may monitor and control various environmental subsystem devices such as temperature sensors, fans, and/or power supplies.

The expander 120 may include a workload scheduling module 140. Depending on the implementation, the workload scheduling module 140 may be implemented in hardware, software, or a combination of both. For example, the workload scheduling module 140 may comprise instructions executable by a processing device (e.g., a SEP) to cause the expander 120 to conduct functions discussed herein. Alternatively or in addition, the workload scheduling module 140 may comprise a hardware equivalent such as an application specific integrated circuit (ASIC), a logic device (e.g., PLD, CPLD, FPGA. PLA. PAL, GAL, etc.), or combination thereof.

The workload scheduling module 140 may be configured to, as necessary, hold-off high priority tasks in a SAS expander in order to guarantee execution time slices for lower priority tasks. More particularly, the workload scheduling module 140 may hold off SAS commands such as SSP and/or SMP commands targeting a Storage Enclosure Processor (SEP) in the expander 120 in order to guarantee execution time slices to lower priority tasks such as environmental processing. Among other benefits, this may allow for guaranteed subsystem monitoring and control, which is of course beneficial for enterprise storage environments.

Figure 2:
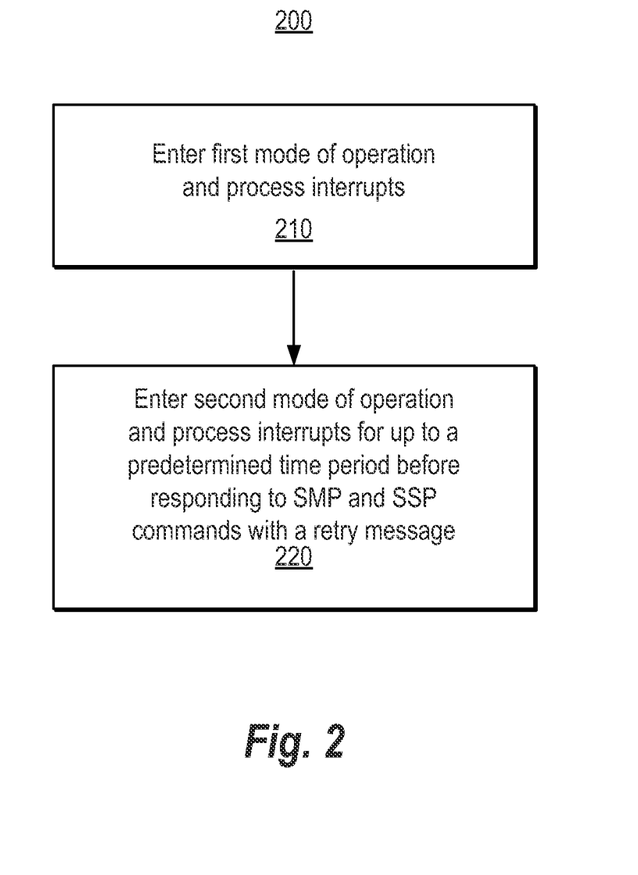
FIG. 2 depicts an example flow chart of processes conducted by an expander in accordance with an implementation.

FIG. 2 depicts an example flow chart of processes 200 conducted by the expander 120 in accordance with an implementation. In some implementations, such processes 200 are conducted by the previously-mentioned workload scheduling module 140. It should be readily apparent that the processes depicted in FIG. 2 and other flow charts (e.g., FIG. 4) represent generalized illustrations, and that other processes may be added or existing processes may be removed, modified, or rearranged without departing from the scope and spirit of the present disclosure. In addition, it should be understood that the processes may represent instructions stored on a processor-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with an expander. Furthermore, the flow charts are not intended to limit the implementation of the present disclosure, but rather the flow charts illustrate functional information that one skilled in the art could use to design/fabricate circuits, generate software, or use a combination of hardware and software to perform the illustrated processes.

The process 200 may begin at block 210, where the expander enters a first mode of operation. During this first mode of operation, the expander freely processes interrupts (e.g., interrupts associated with SSP and SMP commands). Additionally, during the first mode of operation, the expander does not conduct low priority processing functions such as monitoring and controlling temperature sensors, fans, and/or power supplies. Furthermore, during this first mode of operation, a task or thread associated with the second mode of operation may be in a sleep state (e.g., "idle task" to be discussed with respect to FIGS. 3(A)-3(C)).

Thereafter, at block 220, the expander enters a second mode of operation where the expander processes interrupts for up to a predetermined time period (e.g., 100 mS) before responding to SMP and/or SSP commands with a retry message (e.g., an OPEN_REJECT (RETRY) primitive). In particular, once the threshold for processing interrupts in the second mode of operation has been met or exceeded, the expander may prevent SMP and/or SSP interrupts from occurring by placing an expander component (e.g., an ASIC) in a RETRY state which causes the expander to respond to SMP and/or SSP commands (e.g., SMP and/or SSP open connection requests) with a retry message. In addition, during the second mode of operation, the expander conducts low priority processing functions such as monitoring and controlling temperature sensors, fans, and/or power supplies. Moreover, during the second mode of operation, the expander measures the amount of time utilized processing interrupts, and adjusts the time associated with a subsequent first mode of operation based on the measured time. Furthermore, during the second mode of operation, the expander executes time critical communication protocols (e.g., I2C, SMBUS, and SGPIO), and while executing these time critical communication protocols, responds to SMP and/or SSP commands with a retry message.

As described in greater detail below, the expander can cycle between the first mode of operation and the second mode of operation based on various timers and predefined and/or configurable settings. For example, the expander can be setup such that the expander enters the second mode of operation every 100 mS. Hence, in situations where there are a large number of interrupts associated with SMP and/or SSP commands that would otherwise prevent or starve out low priority tasks (e.g., during SAS fabric failure mode scenarios), the low priority tasks are still be guaranteed periodic processing time.

Figure 3A:
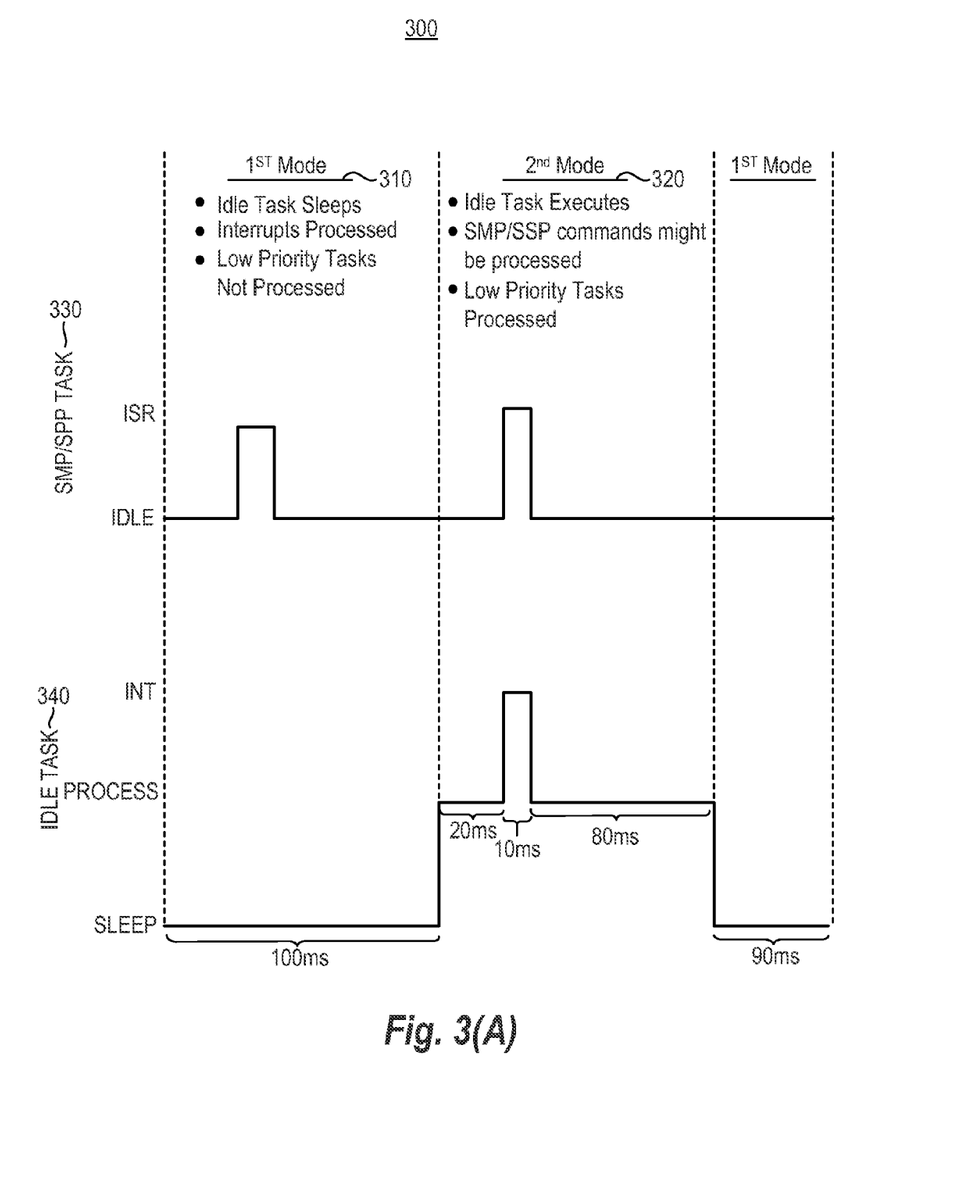
FIG. 3(A) depicts an example timing chart associated with various modes of expander operation in accordance with an implementation.

FIG. 3(A) depicts an example timing chart 300 associated with the above-mentioned first 310 and second 320 mode of operation in accordance with an implementation. In particular, the timing chart shows two tasks/threads "running in parallel." The first task is the "SMP/SSP task" 330, and it depicts whether a SMP/SSP interrupt is being processed ("ISR") or not being processed ("IDLE). The second task is the "idle task" and depicts whether this task is asleep ("SLEEP"), being processed ("PROCESS"), or being interrupted ("INT"). As mentioned, when the idle task 340 is executing, low priority tasks are conducted and interrupts are processed for up to a certain amount of time.

As shown in FIG. 3(A), during the first mode of operation 310, the idle task 340 is in a sleep state and the SMP/SSP task 330 freely processes interrupts, and monitoring and controlling of environmental subsystem devices does not occur. By contrast, during the second mode of operation 320, monitoring and controlling of environmental subsystem devices may occur, but this processing may be interrupted to process interrupts. If an interrupt does occur, however, the amount of time required to process the interrupt is determined, and this amount of time is subtracted from a subsequent sleep time.

For example, referring to FIG. 3(A), for the first 100 mS, the expander is in the first mode of operation 310 and the idle task 340 is in the SLEEP state. During this time, interrupts associated with SMP and/or SSP commands are freely processed. Thereafter, for the next 110 mS, the expander is in the second mode of operation 320, where the idle task is in the PROCESS state and may be interrupted for up to a predetermined time period before responding to SMP and/or SSP commands with a retry message. Moreover, during this second mode of operation, the amount of time spent processing interrupts is recorded, and that amount of time is subtracted from a subsequent idle task sleep buffer. For instance, looking at FIG. 3(A) the idle task 340 processing is interrupted for 10 mS to process an interrupt. This amount of time is recorded, and the subsequent sleep time of idle task would be 10 mS shorter. So, if the idle task sleep buffer is 100 mS as shown in FIG. 3(A), the subsequent idle task sleep buffer would be 90 mS to compensate for the 10 mS spent processing the interrupt.

Figure 3B:
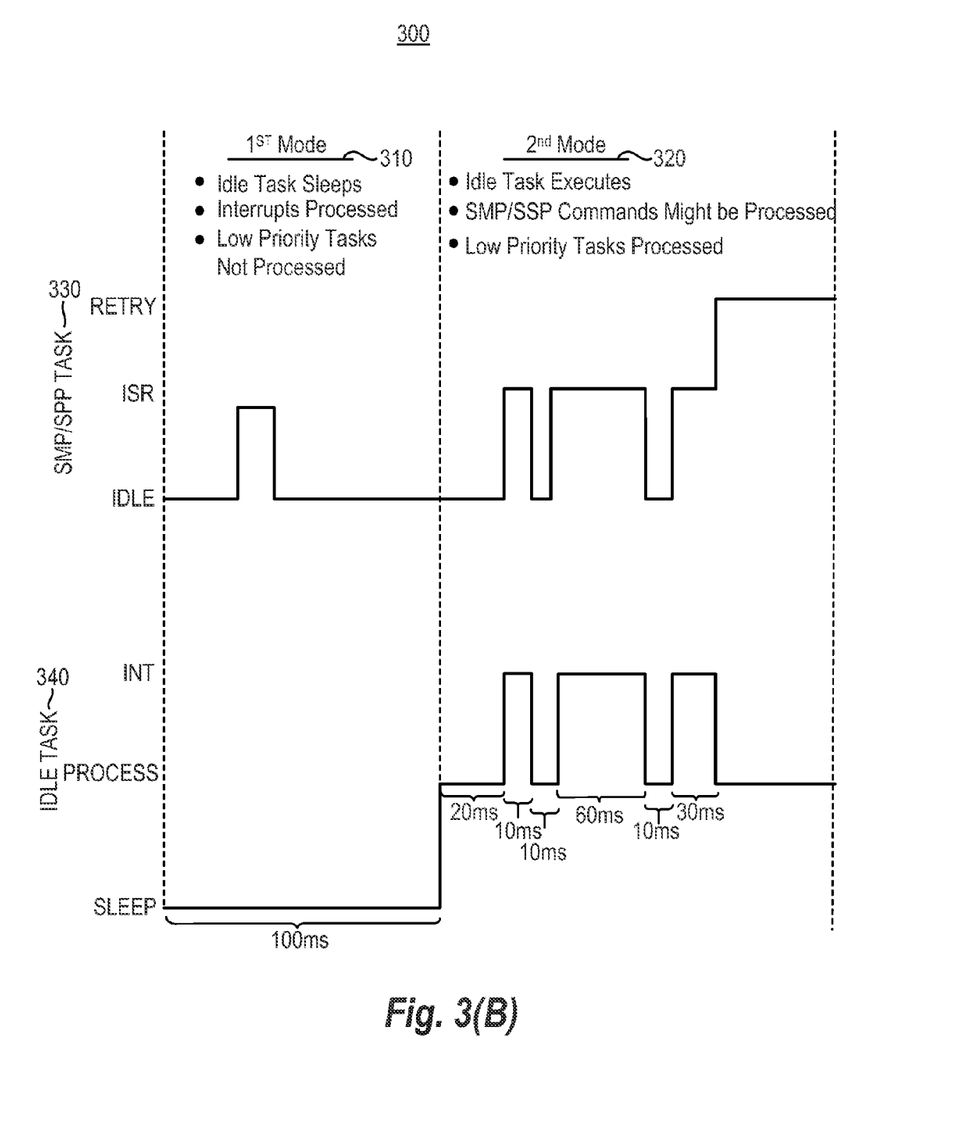
FIG. 3(B) depicts another example timing chart associated with various modes of expander operation in accordance with an implementation.

FIG. 3(B) depicts another example timing chart 300 associated with the above-mentioned first 310 and second 320 mode of operation in accordance with an implementation. In particular, FIG. 3(B) is similar to FIG. 3(A), but depicts an example when the amount of time spent processing interrupts during the second mode of operation 320 exceeds the idle task sleep buffer time (i.e., 100 mS), and therefore the SMP/SSP task 330 enters a RETRY state such that the expander responds to SMP and/or SSP commands with a retry message (e.g., an OPEN_REJECT (RETRY) primitive) in order to guarantee execution time for low priority tasks.

More particularly, during the first mode of operation 310, the idle task 340 is in a SLEEP state and the SMP/SSP task 330 freely processes interrupts. By contrast, during the second mode of operation 320, the idle task 340 is in a PROCESS state but may be interrupted for up to the idle task sleep buffer time 100 mS) before SMP and/or SSP commands are responded to with retry messages. In FIG. 3(B), the idle task is interrupted for 10 mS, 60 mS, and 30 mS to process interrupts. Because the total time spent processing interrupts (i.e., 100 mS) equals the idle task sleep buffer time (i.e., 100 mS), the expander transitions the SMP/SSP task 330 to the RETRY state on that further SMP and/or SSP commands are responded to with retry messages, and the expander can conduct low priority processing functions without being interrupted. As mentioned above, once the threshold for processing interrupts in the second mode of operation has been met or exceeded, the expander may prevent SMP and/or SSP interrupts from occurring by placing an expander component (e.g., an ASIC) in a RETRY state which causes the expander to respond to SMP and/or SSP commands (e.g., SMP and/or SSP open connection requests) with a retry message.

Figure 3C:
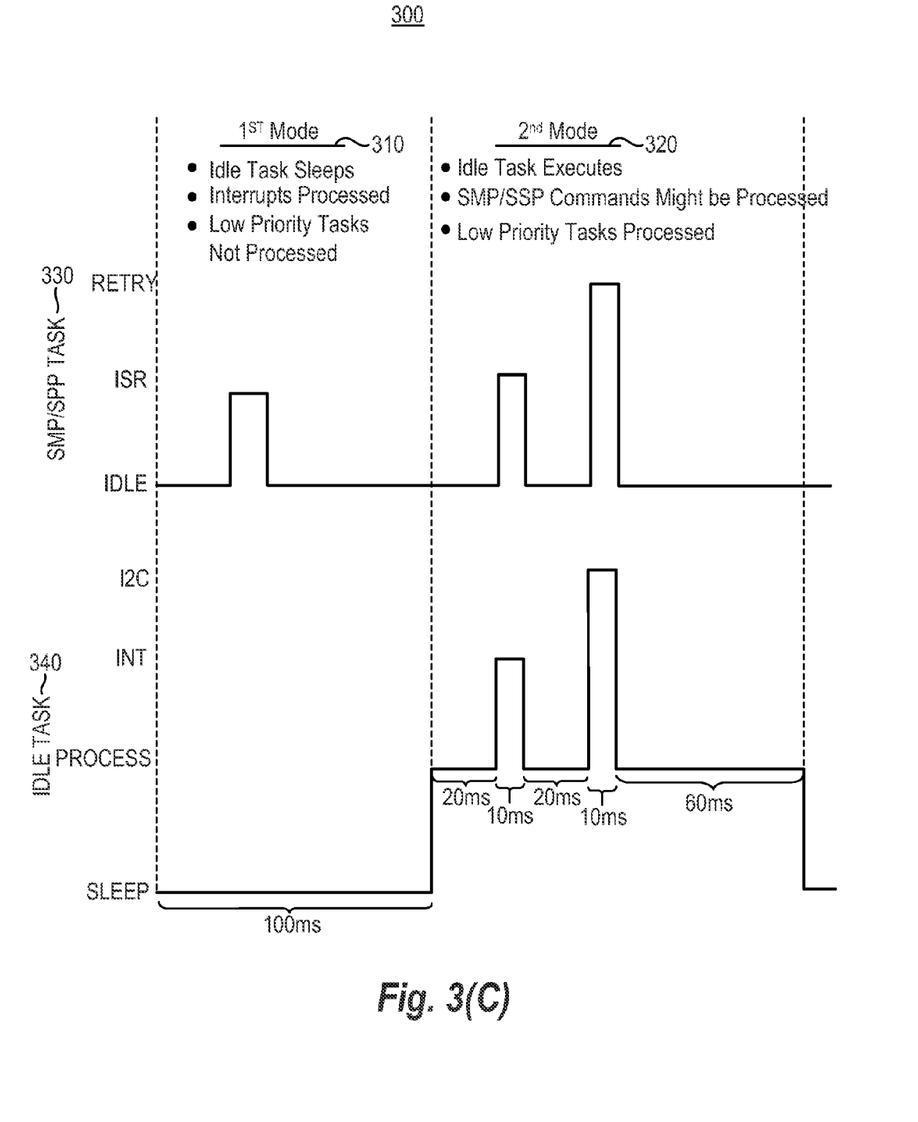
FIG. 3(C) depicts yet another example timing chart associated with various modes of expander operation in accordance with an implementation.

FIG. 3(C) depicts yet another example timing chart 300 associated with the above-mentioned first 310 and second 320 mode of operation in accordance with an implementation. In particular, FIG. 3(C) is similar to FIG. 3(A), but includes an I2C state for the idle task 340. The I2C state is generally time spent executing a time critical communication protocol with another device which cannot be interrupted and therefore the SMP/SSP task 330 is placed in the RETRY state. It should be understood that while the I2C communication protocol is shown in FIG. 3(C), other time critical communication protocols may be included such as system management bus (SMBUS) and serial general purpose input/output (SGPIO).

More particularly, during the first mode of operation 310, the idle task 340 is in a SLEEP state and the SMP/SSP task 330 freely processes interrupts. By contrast, during the second mode of operation 320, the idle task 340 is in a PROCESS state but may be interrupted to process interrupts for up to a certain time period, or to execute a time critical communication protocol (e.g., I2C, SMBUS, SGPIO, etc.). For example and as shown, the idle task processes for 20 mS before being interrupted for 10 mS to process a SMP/SSP interrupt. Thereafter the idle task processes for 20 mS before being interrupted to execute a time critical communication protocol for 10 mS. During this 10 mS the SMP/SSP task 330 enters RETRY mode to keep SMP and/or SSP commands from potentially interrupting the execution of the time critical communication protocol Once complete, the idle task enters the PROCESS state again for 60 mS before entering the SLEEP state.

Figure 4:
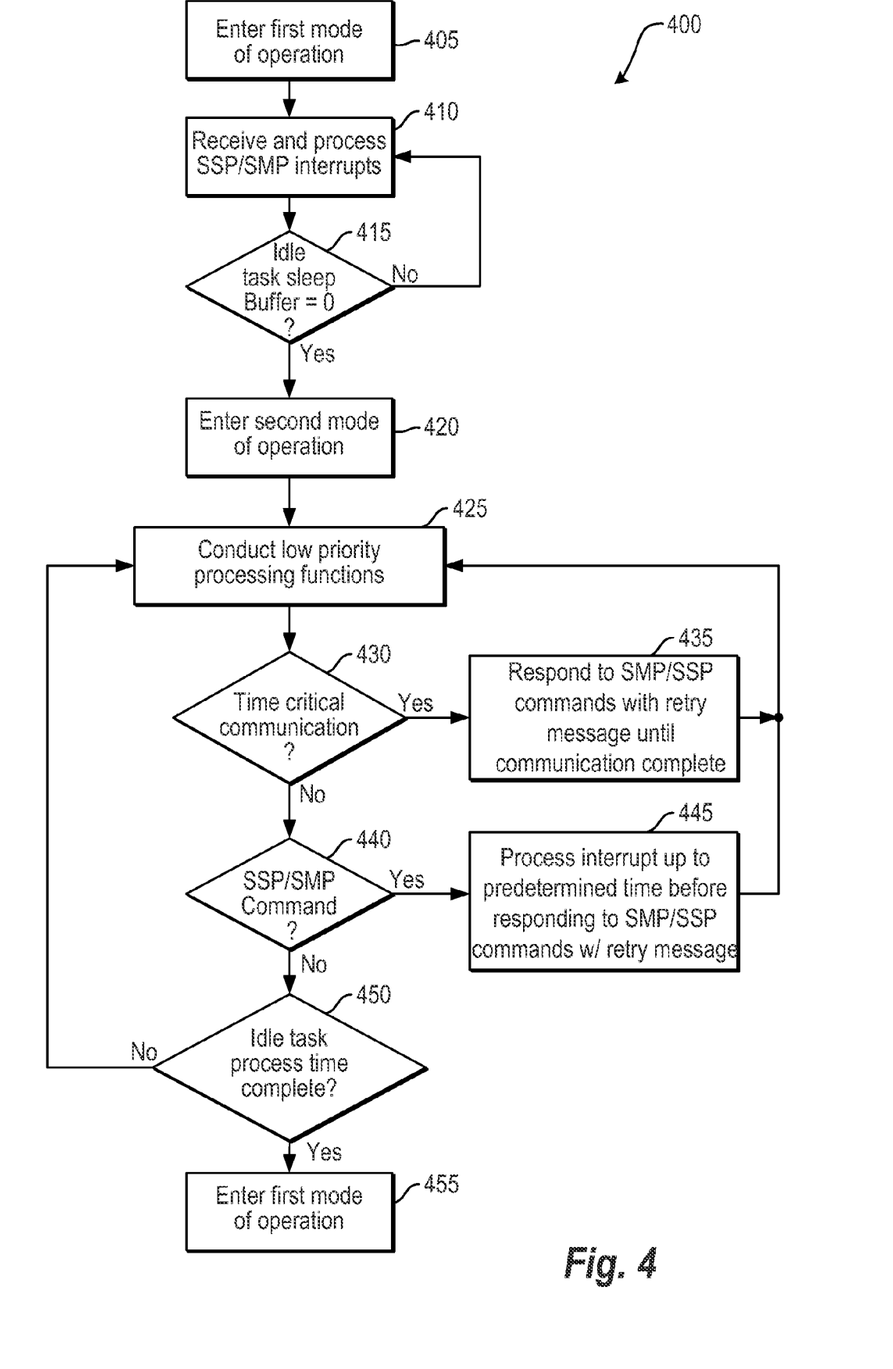
FIG. 4 depicts another example flow chart of processes conducted by an expander in accordance with an implementation.

FIG. 4 depicts another example flow chart in accordance with an implementation. In particular, FIG. 4 provides a detailed description of processes 400 conducted with respect to the modes of operation in accordance with an implementation. Similar to FIG. 2, it should be readily apparent that the processes represent generalized illustrations, and that other processes may be added or existing processes may be removed, modified, or rearranged without departing from the scope and spirit of the present disclosure. In addition, it should be understood that the processes may represent instructions stored on machine-readable storage medium that may cause a processor to respond, to perform actions, to change states, and/or to make decisions. Alternatively or in addition, the processes may represent functions and/or actions performed by functionally equivalent circuits like an analog circuit, a digital signal processing circuit, an ASIC, and/or a logic device associated with an expander.

The process may begin at block 405, when the expander enters the first mode of operation. As mentioned above, during the first mode of operation, interrupts associated with SMP/SSP commands may be processed freely, as shown in block 410. At block 415, the expander may determine if the idle task sleep buffer is complete. If the sleep buffer is not complete, the expander may continue to process SMP/SSP interrupts. If the sleep buffer is complete, the expander may enter the second mode of operation at block 420, As mentioned above and as shown in block 425, during the second mode of operation, the expander may conduct low priority processing functions like monitoring and controlling at least one of temperature sensors, fans, and power supplies. In addition, during the second mode of operation, the expander may processes interrupts for up to a predetermined time period before responding to SMP and/or SSP commands with a retry message. Moreover, the expander may execute time critical communication protocols (e.g., I2C, SMBUS, and SGPIO), and while executing these time critical communication protocols, responds to SMP/SSP commands with a retry message.

For example, at block 430, the expander may determine if there is a time critical communication. If the answer is YES, at block 435, the expander may respond to SMP/SSP commands with a retry message while the time critical communication is being completed. If, on the other hand, the answer is NO, the expander may determine if a SSP/SMP command has been received. If the answer is YES, the expander may process the interrupt for up to a predetermined time (e.g., the amount of time associated with the idle task sleep buffer) before responding to such commands with a retry message. If, on the other hand, the answer is NO, the expander may determine if the idle task process time is complete at block 450. If the answer is NO, the expander may continue to conduct low priority processing functions. By contrast, if the answer is YES, the expander may re-enter the first mode of operation.

Figure 5:
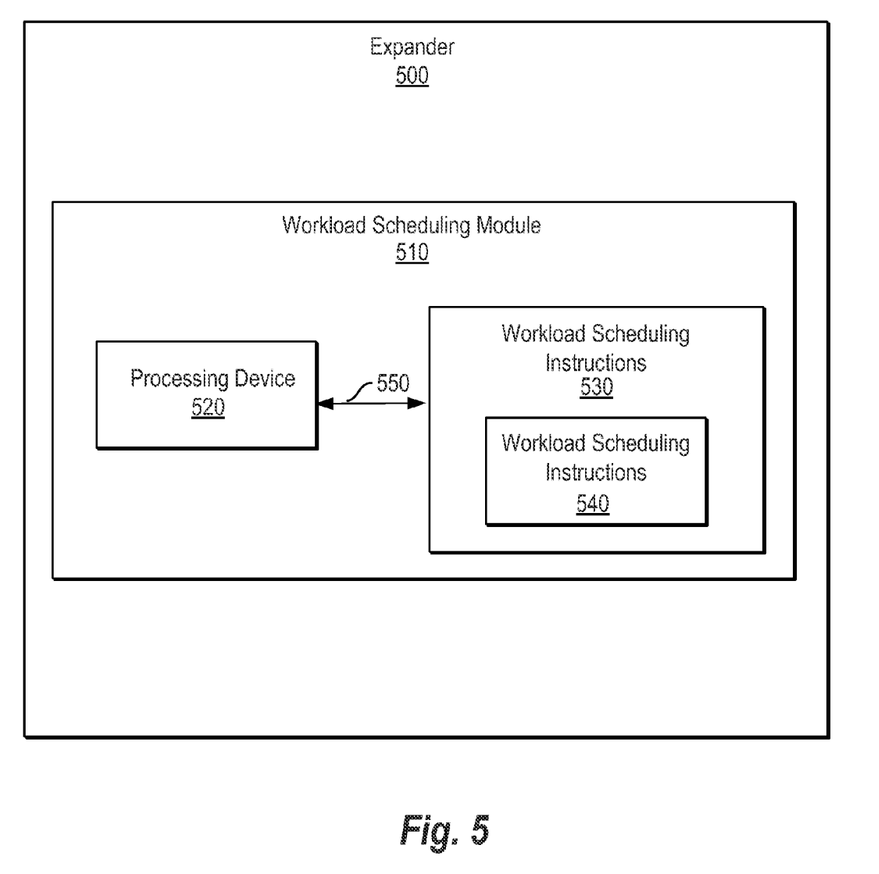
FIG. 5 depicts a non-transitory processor-readable medium in accordance with an implementation.

FIG. 5 depicts an example expander 500 in accordance with an implementation. The expander 500 comprises a workload scheduling module 510 among other components such as ports. PHYS, and the like (not shown). The workload scheduling module 510 comprises a processing device 520 and a non-transitory processor-readable medium 530 connected via a bus 550. The non-transitory processor-readable medium 530 may comprise workload scheduling instructions 540, and may correspond to any typical storage device that stores instructions, such as programming code or the like. For example, the non-transitory processor-readable medium 530 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that may be executed by the processing device 520. In this case, the non-transitory processor-readable medium 530 may be a portable medium such as a CD, DVD, or flash drive or a memory maintained by a server from which the installation package can be downloaded and installed. In another implementation, the instructions may be part of an application or application already installed.

The processing device 520 may be at least one of a processor, a central processing unit (CPU), a semiconductor-based microprocessor, a storage enclosure processor (SEP), or the like. It may retrieve and execute instructions such as fetching, decoding, and the like to cause the expander 500 to operate in accordance with the foregoing description. In one example implementation, the processing device 520 may access the workload scheduling instructions 540 on the processor-readable medium 530 via the bus 530, and execute the instructions 540 to cause the expander 500 to enter a first mode of operation, wherein during the first mode of operation the expander 500 processes at least one of SMP and SSP interrupts. The instructions may further cause the expander 500 to enter a second mode of operation, wherein during the second mode of operation the expander 500 processes at least one of SMP and SSP interrupts for up to a predetermined time period before responding to the at least one of SMP and SSP commands with a retry message (e.g., an OPEN_REJECT (RETRY) primitive).

The foregoing describes a novel and previously unforeseen approach to guarantee processing time at an expander for low priority tasks such as monitoring and controlling environmental subsystem devices. While the above disclosure has been shown and described with reference to the foregoing examples, it should be understood that other forms, details, and implementations may be made without departing from the spirit and scope of the disclosure that is defined in the following claims.

What is claimed is:

1. A method comprising:
   entering, by a Serial Attached SCSI (SAS) expander, a first mode of operation, wherein during the first mode of operation the SAS expander processes interrupts; and
   entering, by the SAS expander, a second mode of operation, wherein during the second mode of operation the SAS expander processes interrupts for up to a predetermined time period before responding to at least one of interrupts associated with Serial Management Protocol (SMP) commands and interrupts associated with Serial SCSI Protocol (SSP) commands with a retry message.

2. The method of claim 1, wherein during the first mode of operation the SAS expander does not conduct low priority processing functions, and wherein during the second mode of operation the SAS expander conducts low priority processing functions.

3. The method of claim 2, wherein the low priority processing functions comprise at least one of monitoring and controlling environmental subsystem devices.

4. The method of claim 3, wherein the environmental subsystem devices comprise at least one of temperature sensors, fans, and power supplies.

5. The method of claim 1, wherein the interrupts comprise at least one of SMP and SSP interrupts.

6. The method of claim 1, wherein the retry message comprises an OPEN_REJECT (RETRY) primitive.

7. The method of claim 1, wherein during the second mode of operation, the SAS expander measures the amount of time utilized processing interrupts, and adjusts the time associated with a subsequent first mode of operation based at least in part on the measured time.

8. The method of claim 1, wherein during the second mode of operation, the SAS expander executes a time critical communication protocol, and while executing the time critical communication protocol, responds to SMP and SSP commands with a retry message.

9. The method of claim 8, wherein the time critical communication protocol comprises at least one of the Inter-Integrated Circuit (I2C) protocol, the System Management Bus (SMBUS) protocol, and the Serial General Purpose Input/Output (SGPIO) protocol.

10. A Serial Attached SCSI (SAS) expander, comprising:
a workload scheduling module to cause the SAS expander to enter a first mode of operation, wherein during the first mode of operation the SAS expander processes interrupts; and
enter a second mode of operation, wherein during the second mode of operation the SAS expander processes interrupts for up to a predetermined time period before responding to at least one of interrupts associated with Serial Management Protocol (SMP) commands and interrupts associated with Serial SCSI Protocol (SSP) commands with a retry message, and wherein during the second mode of operation the SAS expander conducts low priority processing functions.

11. The SAS expander of claim 10, wherein during the first mode of operation the SAS expander does not conduct low priority processing functions.

12. The SAS expander of claim 10, wherein the interrupts comprise at least one of SMP and SSP interrupts.

13. The SAS expander of claim 10, wherein the low priority processing functions comprise at least one of monitoring and controlling at least one of temperature sensors, fans, and power supplies.

14. The SAS expander of claim 10, wherein the retry message comprises an OPEN_REJECT (RETRY) primitive.

15. The SAS expander of claim 10, wherein the workload scheduling module is further to cause the SAS expander to execute a time critical communication protocol during the second mode of operation, and while executing the time critical communication protocol, respond to SMP and SSP commands with a retry message.

16. A non-transitory processor readable medium comprising instructions which, when executed, cause a Serial Attached SCSI (SAS) expander to:
enter a first mode of operation, wherein during the first mode of operation the SAS expander processes at least one of interrupts associated with Serial Management Protocol (SMP) and Serial SCSI Protocol (SSP) commands; and
enter a second mode of operation, wherein during the second mode of operation the SAS expander processes at least one of SMP and SSP interrupts for up to a predetermined time period before responding to the at least one of SMP and SSP commands with a retry message.

17. The non-transitory processor readable medium of claim 16, wherein the retry message comprises an OPEN_REJECT (RETRY) primitive.

18. The non-transitory processor readable medium of claim 16, wherein the instructions further cause the SAS expander to not conduct low priority processing functions during the first mode of operation, and to conduct low priority processing functions during the second mode of operation.

19. The non-transitory processor readable medium of claim 18, wherein the low priority processing functions comprise at least one of monitoring and controlling at least one of temperature sensors, fans, and power supplies.

20. The non-transitory processor readable medium of claim 16, wherein the instructions further cause the SAS expander to measure the amount of time utilized processing at least one of SMP and SSP interrupts during the second mode of operation, and adjust the time associated with a subsequent first mode of operation based on the measured time.

* * * * *